United States Patent [19]
Judice et al.

[11] 3,959,583
[45] May 25, 1976

[54] ANIMATED DITHERED DISPLAY SYSTEMS

[75] Inventors: Charles Norris Judice, Lincroft; Charles Sheldon Roberts, Holmdel, both of N.J.

[73] Assignee: Bell Telephone Laboratories, Incorporated, Murray Hill, N.J.

[22] Filed: Jan. 21, 1975

[21] Appl. No.: 542,862

[52] U.S. Cl................. 178/7.3 D; 178/DIG. 3; 307/235 N
[51] Int. Cl.²............................................ H04N 3/14
[58] Field of Search.............. 178/DIG. 3, 7.3 D; 340/324 M; 315/169 TV; 307/235 N

[56] References Cited
UNITED STATES PATENTS

| | | | |
|---|---|---|---|
| 3,787,834 | 1/1974 | Elliott | 315/169 TV |
| 3,843,959 | 10/1974 | Owaki et al. | 178/7.3 D |
| 3,851,189 | 11/1974 | Moyer | 307/235 N |
| 3,887,763 | 6/1975 | Hinoshita et al. | 178/DIG. 3 |

*Primary Examiner*—George H. Libman
*Attorney, Agent, or Firm*—Ronald D. Slusky

[57] ABSTRACT

The random cell scintillations which have been observed in animated dithered displays are substantially eliminated by establishing a hysteresis band about the dither threshold value assigned to each display cell. The hysteresis band is delimited by upper and lower dither threshold values. Determination of whether the intensity of each picture element of the image to be displayed is to be compared to the upper or the lower threshold value assigned to the corresponding display cell is made based on the current state of the cell.

24 Claims, 5 Drawing Figures

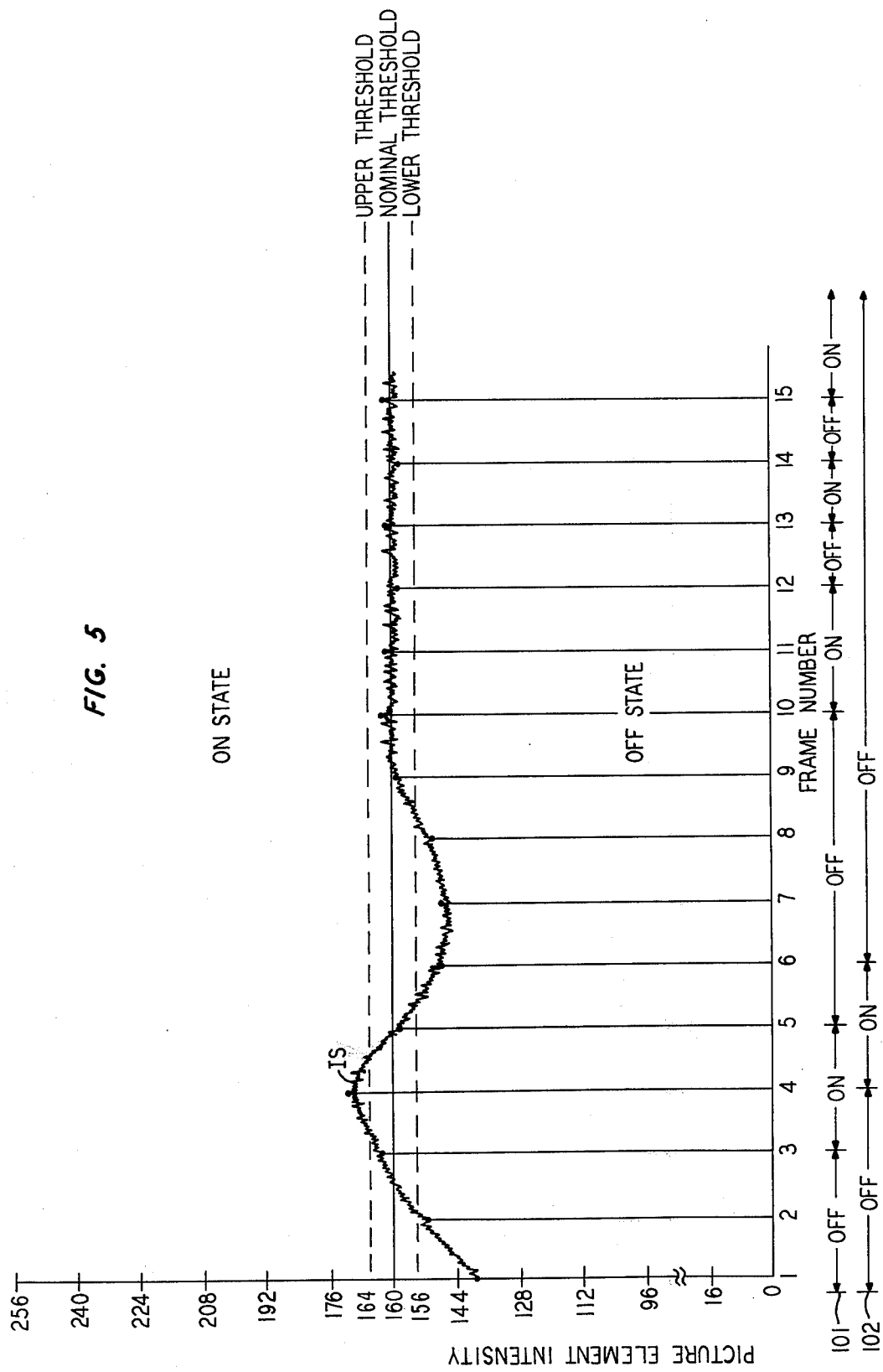

ANIMATED DITHERED DISPLAY SYSTEMS

BACKGROUND OF THE INVENTION

The present invention relates to animated bi-level display systems and, in particular, to a method and arrangement for minimizing scintillations in animated dithered displays.

At the heart of a bi-level display system is a display panel typically comprising a matirx of individual, closely spaced display cells each of which resides in one of two visual states. That is, each display cell is either completely energized (on) or completely de-energized (off). Picture images and other graphic data are readily displayed on a bi-level display panel via selective energization of its cells.

Since the cells of a bi-level display panel are either completely on or off, the panel has no inherent capability for representing gray scale in reproduced images. Advantageously, however, it is known that a subjective impression of gray scale can be produced by way of a technique known as "dither processing." In a so-called "dithered display system" the observer is made to perceive various shades of gray, i.e., variations in intensity, in the reproduced imaage by appropriate arrangement of on and off cells.

Dither is implemented in a bi-level display system by dividing the image to be reproduced into a matrix of picture elements, each element corresponding to a respective cell of the display panel. A predetermined dither threshold value is assigned to each display cell. If the intensity of any given picture element is greater than the dither threshold value assigned to the corresponding display cell, that cell is turned on. Otherwise, it is maintained off.

A bi-level display system can be adapted to present animated dithered images by providing therein circuitry for displaying sucessive dithered frames at a rate of sufficient for the eye to integrate the frames into smooth, continuous motion. A "write", or "energize" signal is extended to each cell which is to be on for a given frame. An "erase", or "de-energize", signal is extended to each cell which is to be off for that frame. However, this animation technique requires that the display cells be able to be accessed to receive a write or an erase signal at a very rapid rate since each cell must be accessed in each frame. Unfortunately, the cells in some bi-level display panels (including, for example, most commercially available plasma display panels) cannot be accessed fast enough to display a sufficiently large number of frames per second to present a pleasing animated image.

Alternatively, as disclosed in the copending U.S. patent application of C. N. Judice, Ser. No. 546,863 filed on the same day as this application and assigned to the same assignee now U.S. Pat. No. 3,937,878, issued Feb. 10, 1976, animated images can be presented advantageously in such "slow" dithered display systems by utilizing therein a technique known as "conditional replenishment." In accordance with this technique, the only display cells which are accessed to receive a "write" or an "erase" signal in any given frame are cells which are to have states in that frame which differ from their respective states in the previous frame. The remaining cells are not accessed at all. Rather, they are maintained in their respective previous on or off states.

SUMMARY OF THE INVENTION

Disadvantageously, a displeasing random scintillation of cells may be observed when either of the two above-described or other animation techniques are implemented in a dithered display system. We have found that these scintillations are caused by noise in the system. The intensity of a particular picture element may be so close to the dither threshold value assigned to the corresponding display cell that even a low-amplitude noise signal superimposed on the intensity signal causes random crossing and recrossing of the dither threshold in successive frames and thus causes the cell to scintillate.

Accordingly, an object of the present invention is to provide an improved animated dithered display system.

A more specific object of the invention is to minimize cell scintillations in the images presented by such systems.

Scintillations in animated dithered images are substantially eliminated in accordance with the present invention by a technique, or method, hereinafter referred to as "hysteretic dither thresholding." A hysteresis band is established about each dither threshold value. The band is delimited by upper and lower dither threshold values located on opposite sides of the conventional, or "nominal", value. An off cell is turned on only if the intensity of the corresponding picture element becomes greater than the upper threshold value assigned to that cell. An on cell is turned off only if the intensity of the corresponding picture element becomes less than the lower threshold value assigned to that cell.

BRIEF DESCRIPTION OF THE DRAWING

The invention may be clearly understood from a consideration of the following detailed description and accompanying drawing in which

FIG. 2 is an enlarged view of a portion of the display panel utilized in the display system of FIG. 1 and shows the dither threshold values assigned to the cells of the panel;

FIG. 3 is a map of picture element intensity values for a small portion of an illustrative image to be presented by the display system of FIG. 1;

FIG. 5 is a time chart showing over a sequence of frames the intensity value of a selected picture element of an animated image to be displayed by the system of FIG. 1.

DETAILED DESCRIPTION

Figure 1:
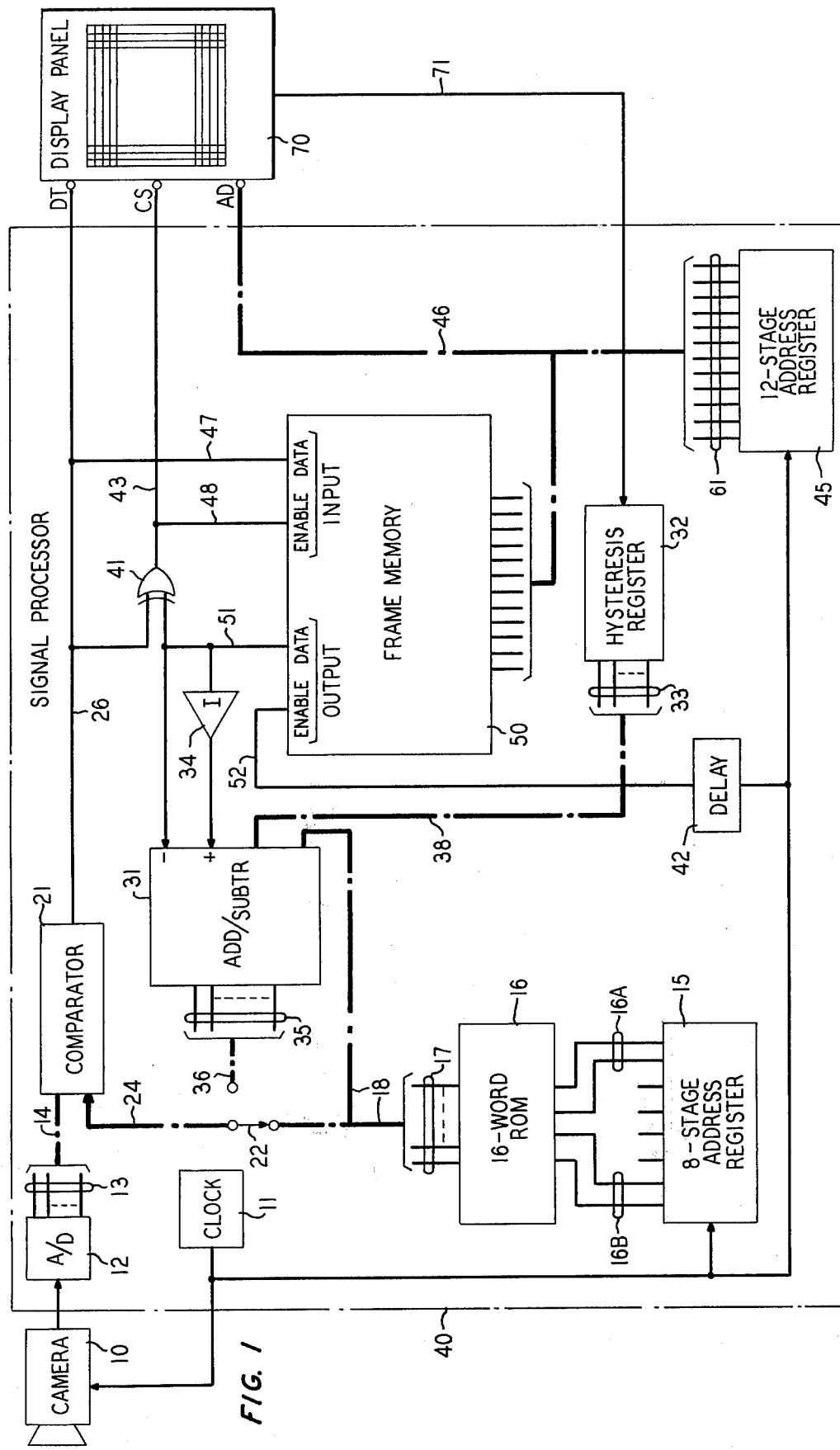
FIG. 1 is a block diagram of an animated dithered display system including illustrative circuitry for implementing hysteretic dither thresholding in accordance with the present invention.

The animated dithered display system of FIG. 1 includes a camera 10, a signal processor 40 and a bi-level display panel 70. Panel 70 is illustratively a plasma display panel such as that disclosed in D. T. Ngo U.S. Pat. No. 3,671,938 issued June 20, 1972. Advantageously, however, the present invention can be implemented in a system including virtually any type of bi-level display panel. Panel 70 comprises 4096 display cells arranged in a square matrix of 64 rows and 64 columns. Of course, it will be appreciated that the number of cells is, again, merely illustrative. Each of the cells of bi-level display panel 70 resides in one of two visual states—either fully energized, or on, or fully de-energized, or off.

Figures 2, 3:
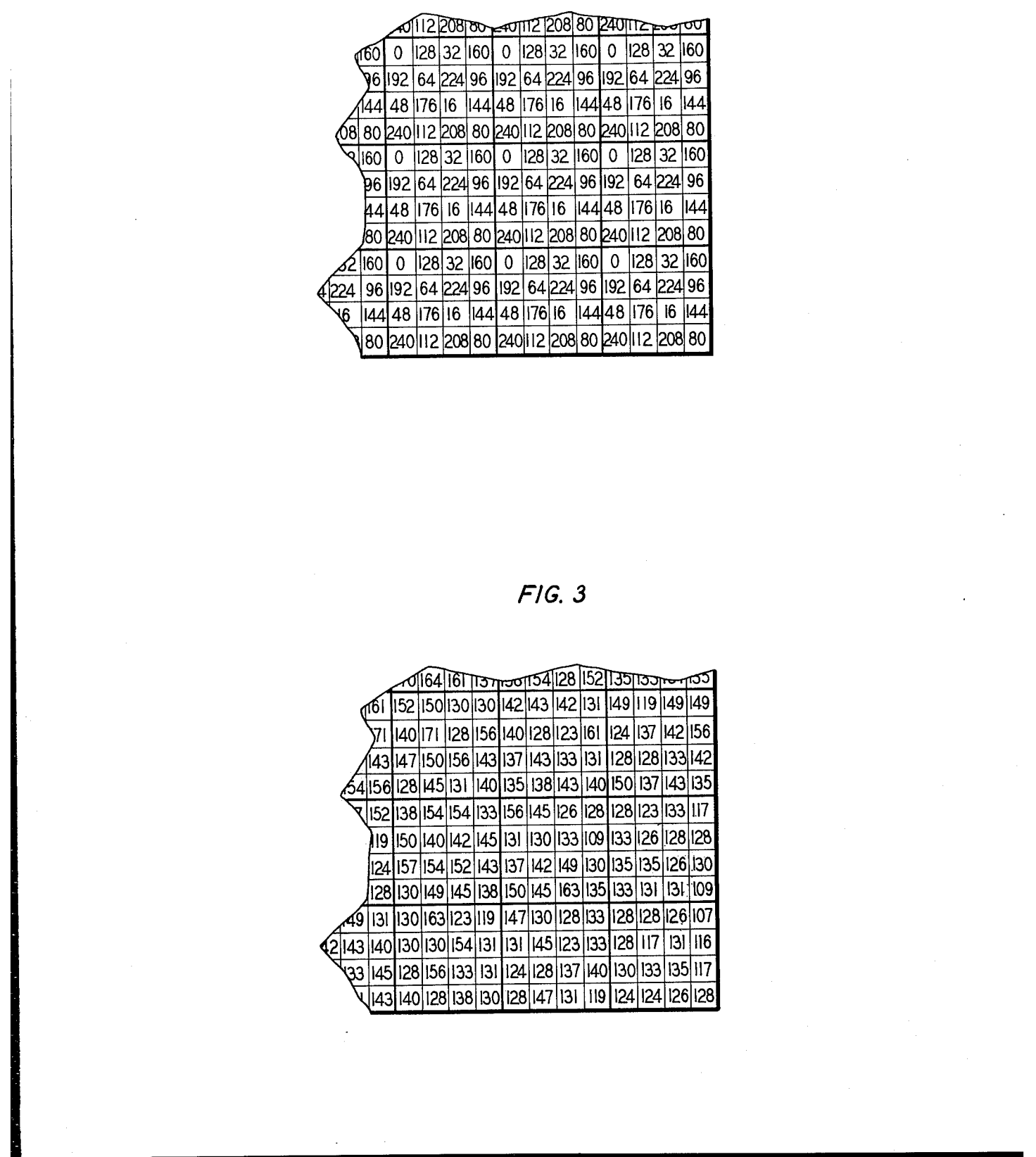

A small portion of the lower right-hand corner of panel 70 is shown in enlarged view in FIG. 2. As indicated in that figure, each of the cells of panel 70 is assigned a dither threshold value taken from the predetermined 16-element "dither matrix"

$$\begin{bmatrix} 0 & 128 & 32 & 160 \\ 192 & 64 & 224 & 96 \\ 48 & 176 & 16 & 144 \\ 240 & 112 & 208 & 80 \end{bmatrix}.$$

As also indicated in FIG. 2, the cells of panel 70 may be conceptualized as being divided into a plurality of submatrices each comprising 16 cells. There is thus assigned a different threshold value from the dither matrix to each cell of any given submatrix.

The dither matrix utilized in a dithered display system such as that shown in FIG. 1 can be chosen to comprise more or fewer than sixteen elements, depending on the needs of the particular application. Advantageously, increasing the number of cells per dither matrix increases the number of shades of gray which are represented in the reproduced image without degrading the spatial resolution of the image.

For best results, numerically successive threshold values of a dither matrix, whatever its size, should be spatially separated from one another with the matrix. It is known that a gereralized $n$ cell-by-$n$ cell dither matrix $D_n$ which fulfills this criterion, $n$ being an integer power of 2, can be constructed by combining the four matrices $k[4D_{n/2}]$, $k[4D_{n/2} + U_{n/2}]$, $k[4D_{n/2} + 2U_{n/2}]$ and $k[4D_{n/2} + 3U_{n/2}]$ in two-by-two arrangement such as $$D_n = \begin{bmatrix} k[\phantom{4}4D_{n/2}\phantom{4}] & k[4D_{n/2} + 2U_{n/2}] \\ k[4D_{n/2} + 3U_{n/2}] & k[4D_{n/2} + U_{n/2}] \end{bmatrix}.$$

This a recursive definition in which $D_2$ is a two-by-two matrix comprising the numbers "0", "1", "2" and "3" such as the matrix $$\begin{bmatrix} 0 & 2 \\ 3 & 1 \end{bmatrix}.$$

$U_2$ is a two-by-two matrix each element of which is "1", and $k$ is a predetermined scalar constant. The 16-element dither matrix $D_4$ utilized in the display system of FIG. 1 is derived from the above definition with $k$ chosed to be 16. If desired a 64-element dither matrix $D_8$ can be derived from dither matrix $D_4$ using this definition, and so forth. It is preferable, although not necessary, that the matrices $k[4D_{n/2}]$ and $k[4D_{n/2} + U_{n/2}]$ be on the same one diagonal of dither matrix $D_n$ and the numbers "0" and "1" be on the same one diagonal of matrix $D_2$.

An image to be presented on panel 70 in accordance with known dither processing techniques is scanned in a format which divides the image into a matrix of 4096 picture elements arranged in 64 rows and 64 columns. Each scanned picture element thus corresponds to a single one of the cells of panel 70. The intensity of each picture element in the illustrative embodiment is quantized into one of 256 intensity levels, or values. The quantized intensity value of each picture element is compared to the dither threshold value assigned to the corresponding display cell. If the intensity value of any given picture element is greater than the dither threshold value assigned to the corresponding display cell, that cell is turned on. Conversely, if the intensity value of any given picture element is less than or equal to the dither threshold value assigned to the corresponding display cell, that cell is maintained off.

Figure 4:
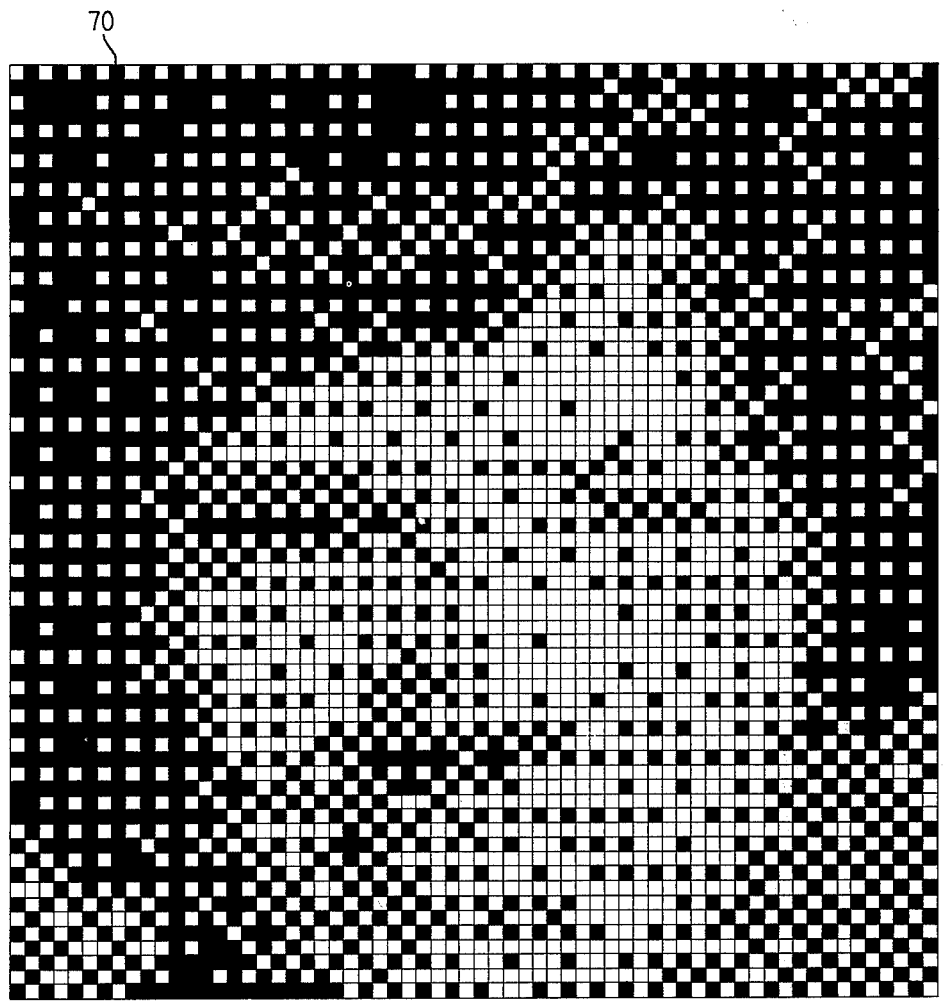
FIG. 4 is an enlarged view of the display panel utilized in the display system of FIG. 1, the panel having selected ones of its cells energized to present a dithered image.

FIG. 3 shows a map of picture element intensity values for a small portion of an illustrative scanned image to be presented on panel 70. These picture elements correspond to respective ones of the lower right-hand corner cells of panel 70 shown in FIG. 2. FIG. 4 depicts an enlarged view of panel 70 with selected ones of its cells energized to present a dithered image. The light areas in FIG. 4 correspond to display cells which are on. The dark areas correspond to display cells which are off. The pattern of on and off cells in the lower right-hand corner of FIG. 4 is derived by comparing the picture element intensity values in the map of FIG. 3 with the dither threshold values assigned to the corresponding cells of panel 70 as shown in FIG. 2. When the viewer observes the FIG. 4 representation of panel 70 from a distance, it will be seen that, as a result of the above-described dither processing, various shades of gray appear in the reproduced image.

The circuitry in FIG. 1 which provides for the presentation of dithered images on panel 70 includes camera 10 and circuitry in signal processor 40 including clock 11, analog-to-digital converter 12, address register 15, 16-word read-only memory (ROM) 16, comparator 21 and address register 45.

An image to be displayed is scanned by camera 10 in a format which divides the image into a matrix of 4096 picture elements arranged in 64 rows and 64 columns. Scanning begins with the top row and proceeds from left to right in each row. Camera 10 generates an analog signal representing the intensity of the picture element currently being scanned. Each of successive, regularly spaced pulses from clock 11 causes the signal representing the intensity of a successive scanned picture element to be extended from camera 10 to digital-to-analog converter 12. The latter quantizes each intensity signal extended thereto into one of 256 levels. A multi-bit binary signal indicative of that level is extended to comparator 21 via binary leads 13 and cable 14.

The pulses from clock 11 are also extended to address register 15. The latter comprises an eight-stage binary counter which advances on count for each pulse from clock 11. The two lowest-order address leads 16A of ROM 16 are coupled to the outputs of the two least significant stages of register 15. The two highest-order address leads 16B of ROM 16 are coupled to the two most significant stages of register 15. The 16 dither threshold values assigned to the cells in each submatrix of panel 70 as shown in FIG. 2 are stored in ROM 16 in the order 0, 128, 32, 160, 192, 64, 224, 96, 48, 176, 16, 144, 240, 112, 208, 80.

Thus it will be appreciated that the output of ROM 16 in response to each group of 256 successive pulses from clock 11 comprises the sequence 0, 128, 32, 160 repeated 16 times, then the sequence 192, 64, 224, 96 repeated 16 times, then the sequence 48, 176, 16, 144 repeated 16 times and then the sequence 240, 112, 208, 80 repeated 16 times. This sequence of threshold values is provided in binary form on output leads 17 of ROM 16 and is extended via cable 18, cable switch 22, and cable 24 to comparator 21. In this way, the quantized intensity value of each picture element is extended to comparator 21 concurrently with the dither threshold value assigned to the cell in display panel 70 which corresponds to that picture element.

The output of comparator 21 is a one-bit binary signal which is extended to data input terminal DT of panel 70 via lead 26. The value of the signal on lead 26 is "1" if the intensity value represented on cable 14 is greater than the dither threshold value represented on cable 24. This "1" indicates to panel 70 that the cell corresponding to the picture element currently being scanned should be on. Circuitry internal to panel 70 accesses that cell to extend a "write", or "energize", signal thereto. If, on the other hand, the intensity value represented on cable 14 is less than or equal to the dither threshold value represented on cable 24, a "0" is provided on lead 26 indicating that that cell should be off. In that case, the cell is accessed with an "erase", or "de-energize" signal.

A multi-bit binary signal indicating the location of the cell corresponding to the picture element currently being scanned is extended to address input AD of panel 70 from address register 45 via binary leads 61 and cable 46. Register 45 is illustratively a 12-stage binary counter which advances one count for each pulse from clock 11. The six most significant and the six least significant bits on leads 61 respectively indicate the row and column of panel 70 in which the cell in question is located.

Animated dithered images could be presented in a dithered display system such as that shown in FIG. 1 by simply scanning successive frames of the image and accessing each cell of the display panel with a "write" or an "erase" signal as just described. As indicated above, however, it may not be possible to utilize this animation technique in display systems having slow-access-rate cells since each cell must be accessed for each frame. Panel 70 illustratively comprises such cells.

Alternatively, a dithered display system may be adapted to present animated images via circuitry for implementing conditional replenishment. In accordance with this technique, which is disclosed in the above-cited C. N. Judice patent application, the only display cells which are accessed to receive an "energize" or a "de-energize" signal for any given frame are cells which are to have states in that frame which differ from their respective states in the previous frame. The remaining cells are not accessed at all but, rather, are maintained in their respective previous on or off states. In presenting many types of animated dithered images, such as faces, only a small fraction of the display cells have different states in successive frames. Thus, by implementing the above-described conditional replenishment technique in a plasma panel system or other display system having slow-access-rate cells, successive frames of animated dithered images can be presented at a frame rate sufficient to depict smooth, continuous motion.

The display system of FIG. 1 is illustratively adapted to present animated images via the above-described conditional replenishment technique. However, the present invention, as described in detail hereinbelow can be effectively implemented in other types of animated dithered display systems as well. Circuitry providing conditional replenishment in the system of FIG. 1 includes exlusive-OR circuit 41, delay unit 42 and frame memory 50. Frame memory 50 has facility to store 4096 bits, each corresponding to a respective display cell in panel 70. The value of each bit in memory 50 indicates the current state of the corresponding display cell—"1" for on and "0" for off. Memory 50 operates in response to a signal on output-enable lead 52 to provide on data output lead 51 a bit indicating the current state of whichever cell is identified by the address on cable 46. The signal on output-enable lead 52 is derived from clock 11 via delay unit 42. The latter assures that address register 45 has "settled down" before the data output of memory 50 is enabled.

Assume that a first dithered frame of an animated sequence has been presented on panel 70 in the manner described above and that camera 10 now begins to scan a second frame of the sequence. As before, the signal on lead 26 indicates the state in which the cell corresponding to the picture element currently being scanned is to reside. Again, the signal on cable 46 indicates to panel 70 the location of that cell. However, a given cell will not be accessed to receive a "write" or an "erase" signal unless a binary signal of value "1" is provided at "change-state" terminal CS of panel 70, indicating that the state of that cell is to change.

The signal at change-state terminal CS is generated by exclusive-OR circuit 41 and is extended to panel 70 via lead 43. Exclusive-OR circuit 41 is responsive to the signals on leads 26 and 51. Thus exclusive-OR circuit 41 provides a binary "1" on lead 43 if and only if the state of the cell corresponding to the picture element currently being scanned is different for the first and second frames. In that event the cell in question, as identified by the address on cable 46, is accessed within panel 70 and its state is changed to the state indicated on lead 26.

The signals on leads 26 and 43 are also extended to data input lead 47 and input enable lead 48 of memory 50, respectively. Whenever the value of the signal on lead 48 is "1", the signal on lead 47 indicating the new cell state is written into memory 50 at the appropriate memory location.

The display system of FIG. 1 operates in the above-described manner with respect to each scanned picture element for each frame of the animated sequence.

The present invention is directed to the minimization of a displeasing effect which is attendant to animated dithered display systems generally, including, for example, conditionally replenished display systems such as that shown in FIG. 1. This displeasing effect is the random twinkling or scintillation of cells throughout the display. Scintillation in animated dithered displays arises, for example, when a relatively constant picture element intensity value is very close to the dither threshold value assigned to the corresponding display cell. Any noise in the display system which becomes superimposed on the intensity signal may then cause random crossing and recrossing of the dither threshold in successive frames and thus cause a random scintillation of the cell.

The nature of this scintillation effect may be more clearly understood by reference to FIG. 5 which shows a signal IS representing the intensity of a single selected picture element during successive frames of an animated sequence. As indicated in FIG. 5, signal IS includes a low-amplitude noise component superimposed thereon. As also indicated in FIG. 5, the conventional, or "nominal", dither threshold value assigned to the display cell corresponding to this selected picture element is illustratively "160". Signal IS is scanned, or sampled, once in each frame at a predetermined point in the frame. Each scanning point is shown in FIG. 5 in alignment with the corresponding frame number marker on the horizontal axis. The precise value of signal IS at each scanning point is indicated by a dot.

The intensity of signal IS is less than the dither threshold "160" at the scanning points of frames 1, 2 and 5–9. Thus as indicated in line entry 101 of FIG. 5, the cell is off for each of these frames. The intensity of signal IS is greater than "160" in frames 3 and 4 and thus the cell is on for these frames. The average value of signal IS is just slightly below the dither threshold value throughout frames 10–15. However, the noise superimposed thereon causes the threshold to be crossed and recrossed at several points in frames 10–15 and the cell scintillates at random intervals.

Several alternative approaches may be taken to reduce this scintillation. One is to withhold changing the state of a cell unless the intensity value of the corresponding picture element remains on the same side of the dither threshold value for a predetermined number of frames, e.g., two frames. Another approach is to withhold changing the state of a cell unless such a change would appreciably alter the average intensity of the display panel in the immediate area of the cell in question.

However, we have discovered a scintillation-reduction technique, or method, which appears to be simpler and at least as effective as either of the above. This method, referred to as "hysteretic dither thresholding", as well as apparatus for performing same, comprise the subject matter of the present invention. In an animated dithered display system utilizing hysteretic dither thresholding, a hysteresis band is established about each dither threshold value. The band is delimited by upper and lower dither threshold values located on opposite sides of the conventional, or nominal, value and separated therefrom by respective predetermined amounts. An off cell is turned on only if the intensity of the corresponding picture element becomes greater than the upper threshold value. An on cell is turned off only if the intensity of the corresponding picture element becomes less than the lower threshold value.

The in FIG. 5, upper and lower threshold values at "164" and "156" are respectively established on opposite sides of the nominal dither threshold, "160". As indicated in line entry 102, the display cell in question is off in frames 1 and 2. The cell remains off in frame 3 even though signal IS is greater than the nominal threshold at the scanning point of that frame because signal IS is less than the upper threshold at that point. The cell is turned on in frame 4, however. Once the cell is on, it is not turned off until signal IS becomes less than the lower threshold. Thus, the cell is on in frame 5 even though signal IS is less than the nominal threshold at the scanning point of that frame. Signal IS is less than the lower threshold in frame 6, however, and therefore the cell is off for that frame. The cell remains off in frames 7–15 because at no time is the upper threshold exceeded during these frames. The above-described random scintillation in frames 10–15 is thus seen to be eliminated.

Circuitry for implementing hysteretic dither thresholding in the animated dithered display system of FIG. 1 in accordance with the invention illustratively includes cable switch 22, adder/subtractor 31, hysteresis register 32 and inverter 34. This circuitry is made an operative part of the system by moving switch 22 to a position such that it is the output of adder/subtractor 31 on binary leads 35 and cable 36 which is extended to comparator 21 via cable 24 rather than the output of ROM 16.

Hysteresis register 32, which may comprise a binary counter, for example, provides a multi-bit binary signal on leads 33 and cable 38. This signal represents a predetermined amount to be added to or subtracted from a nominal dither threshold value to derive its associated upper and lower dither threshold values, respectively. In the illustrative embodiment, this predetermined amount is binary "100", i.e., decimal "4".

Cable 38 is extended to one data terminal of adder/subtractor 31. A tap off cable 18 is extended to the other data terminal. Adder/subtractor 31 operates to add the numbers on cables 18 and 38 when "1" and "0" are provided at its "+" and "−" control terminals, respectively. It subtracts these numbers if the opposite relationship obtains.

When hysteretic dither thresholding is implemented in a conditionally replenished dithered display system in straightforward manner, at least two memory bits per picture element, i.e., per display cell, are required. A first bit is required to store the current state of the cell to determine whether the state of that cell differs in the current and subsequent frames. This function is illustratively provided by the memory cells of frame memory 50, as previously described. A second bit per picture element is required to indicate whether, at any given time, the intensity of the picture element is to be compared to the upper or lower dither threshold value assigned to the corresponding display cell. In the illustrative embodiment of FIG. 1, the value of this second bit would control the signals at the "+" and "−" control terminals of adder/subtractor 31.

However, the copending patent application of W. H. Ninke, U.S. patent application Ser. No. 546,863 filed on the same day as this application and assigned to the same assignee now U.S. Pat. No. 3,925,609, issued Dec. 9, 1975, discloses that determination of whether a given picture element is to be compared to the upper or lower dither threshold value assigned to the corresponding display cell can be made based on the current state of that cell and need not be kept track of independently. A conditionally replenished dithered display system implementing hysteretic dither thresholding in the manner contemplated by the above-mentioned Ninke application thus requires only on bit per picture element-the same on bit per picture element necessary to implement conditional replenishment in any event.

It will be remembered that the current state of each cell in the display system of FIG. 1 stored in frame memory 50 is provided on lead 51 as the picture element to which a particular cell corresponds is being scanned. Thus in FIG. 1, the signals at the "+" and "−" control terminals of adder/subtractor 31 are derived from the bit on lead 51. More particularly, a tap taken off that lead is coupled to the "−" control terminal directly and to the "+" control terminal through inverter 34.

When the cell corresponding to a picture element currently being scanned is on, a "1" is provided on lead 51 and thus at the "−" control terminal of adder/subtractor 31. At the same time, a "0" is provided at the "+" control terminal thereof. The amount on cable 38 is subtracted from the nominal dither threshold value on cable 18. Comparator 21 thus compares the quantized intensity of the picture element being scanned to the lower threshold value assigned to the corresponding display cell.

Conversely, when the cell corresponding to a picture element currently being scanned is off, "1" and "0" are provided at the "+" and "−" terminals of adder/subtractor 31, respectively. The numbers on cables 18 and 38 are added together. Comparator 21 thus compares the quantized intensity value of the picture element being scanned to the upper threshold value assigned to the corresponding display cell.

Although the conditional replenishment technique implemented in the display system of FIG. 1 as described hereinabove requires a relatively small number of cells to be accessed for any given frame, it may turn out that those cells which are accessed in a given frame may be identified to panel 70 during a relatively small fraction of the frame period rather than being spread thereacross randomly. This may happen, for example, where movement in the displayed image is confined to a relatively small area such as the mouth of a person speaking. In this situation, again, it may not be possible to address even those few cells at a fast enough rate. Accordingly, the circuitry in panel 70 may advantageously include a buffer of conventional first-in, first-out design (not shown) for temporarily storing the data and address information extended to the panel until such time as each cell to be changed can be accessed.

As an alternative or in additon to such a buffer, the display system of FIG. 1 may include circuitry responsive to an abnormally high number of cell state changes per frame to modify the width of the hysteresis band about each nominal dither threshold value. Although this technique causes some degradation of image quality, it advantageously reduces the number of cells which are required to change state for any given frame. An overflow lead 71 extending from panel 70 to hysteresis register 32 is provided for this purpose. When the cell change rate reaches some predetermined level, such as indicated by a certain amount of data backlog in the buffer within panel 70, a first signal is provided on overflow lead 71. This signal increases the count in hysteresis register 32 and thus widens the hysteresis band about each nominal dither threshold value. When the overflow condition in the buffer within panel 70 abates, as indicated by a second signal on lead 71, the count in register 32 is returned to its original predetermined value.

Although in the illustative display system of FIG. 1, the change-state signal on lead 43 is extended to panel 70, it will be appreciated that this signal may, alternatively, be utilized as a signal internal to processor 40 to gate the data and address information therefrom to the display panel. In such an arrangement, the fact that a data bit and corresponding address are extended to the display panel indicates that the state of the identified cell is to be changed without the necessity of a separate change-state signal.

It will thus be appreciated that conditional replenishment substantially reduces the number of information bits per unit time which are required to be extended to a display panel in order to have animated dithered images presented thereon. The banwidth required to transmit such images to the display panel is thus also advantageously decreased. Additionally, the hysteretic dither thresholding technique of the present invention further reduces the bandwidth requirement since this technique additonally reduces the number of information bits per unit time which are required to be extended to the display panel.

Furthermore, although the above discussion has been principally directed to display of monochromatic images and, in particular, to animation of such images, it will be appreciated that dither processing can be utilized to display both single-frame and animated polychromatic, or "color", images as well. In such an arrangement, each cell of the display panel comprises a cluster of display devices each adapted to present a different color (e.g., a cluster of three devices to present red, green and blue, respectively) when energized. As in a monochromatic dithered display system, each display device of the polychromatic display cell cluster can only be fully energized or fully de-energized.

When the image to be reproduced is scanned, three intensity signals are generated for each picture element. Each intensity signal indicates the degree to which a selected one of the three colors is present in the particular picture element. The value of each intensity signal associated with a given display cell is compared to the upper or lower threshold value assigned thereto in the manner described hereinabove in accordance with the present invention. For each intensity signal which exceeds the upper dither threshold value, the corresponding display device within the cell cluster is energized. Conversely, for each intensity signal which is less than the lower dither threshold value, the corresponding display device within the cell cluster is de-energized. The result is a pleasing animated color image which, advantageously, may be provided with scintillation-free animation in accordance with the present invention. The subjective impression of variations in luminance, or intensity, is thus provided even though each display device within each cell cluster can only be fully energized or fully de-energized.

It will be appreciated from the foregoing that although an illustrative embodiment of an animated dithered display system in accordance with the principles of the invention is shown and described herein, many and varied arrangements in accordance with those principles may be devised by thosed skilled in the are without departing from the spirit and scope of the invention.

What is claimed is:

1. In a display system including a plurality of selectively energized and de-energized bi-level display cells, a method for representing a matrix of picture elements each having a predetermined intensity and each corresponding to a respective one of said display cells, said method comprising the steps of energizing a de-energized one of said cells if the intensity of the corresponding picture element bears a first predetermined relationship to a first dither threshold value assigned to that cell, and de-energizing an energized one of said cells if the intensity of the corresponding picture element bears a second predetermined relationship to a second dither threshold value assigned to that cell.

2. The method of claim 1 wherein said first and second dither threshold values assigned to an individual one of said cells are predeterminately greater than and less than, respectively, a nominal dither threshold value assigned to said individual cell from a predetermined dither matrix $D_n$.

3. The method of claim 2 wherein each said intensity lies within a range of intensities, wherein said dither matrix $D_n$ comprises a plurality of nominal dither threshold values distributed within said range, wherein said display cells are arranged in a plurality of submatrices, and wherein each of said nominal dither threshold values is assigned to a different one of the cells of at least one of said submatrices.

4. The method of claim 3 wherein each of said submatrices comprises $n^2$ cells in $n$ cell-by-$n$ cell arrangement, $n$ being an integer power of 2, and wherein said dither matrix $D_n$ comprises the matrices $k(rD_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ being a two-by-two matrix each element of which is "1", and $k$ being a predetermined scalar constant.

5. In a display system including a matrix of selectively energized and de-energized display cells arranged in a plurality of $n$ cell-by-$n$ cell submatrices, $n$ being an integer power of 2, and each cell of each submatrix having assigned thereto a different threshold value taken from a predetermined dither matrix $D_n$, said dither matrix comprising the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ beng a two-by-two matrix each element of which is "1", and $k$ being a predetermined scalar constant, a method for representing a matrix of picture elements each having a predetermined intensity and each corresponding to a respective one of said display cells, said method comprising the steps of identifying each picture element having an intensity which exceeds the dither threshold value assigned to its corresponding display cell by at least a predetermined amount and applying energization signals to each such cell, and identifying each picture element having an intensity which is less than the dither threshold value assigned to its corresponding display cell by at least a predetermined amount and applying de-energization signals to each such cell.

6. The method of claim 5 wherein said matrices $k(4D_{n/2})$ and $k(4D_{n/2} + U_{n/2})$ are located on a single one diagonal of said dither matrix $D_n$ and said number "0" and "1" are located on a single one diagonal of said matrix $D_2$.

7. In a display system including a matrix of normally de-energized bi-level display cells to each of which correspond a first frame and a second frame picture element intensity and to each of which is assigned a respective threshold value from a predetermined dither matrix $D_n$, a display method comprising the steps of identifying each cell having a corresponding first frame picture element intensity which differs from the dither threshold value assigned thereto by at least a first predetermined amount and energizing each such cell, identifying each de-energized cell having a corresponding second frame picture element intensity which differs from the dither threshold value assigned thereto by at least said first predetermined amount and energizing each such cell, and identifying each energized cell having a corresponding second frame picture element intensity which differs from the dither threshold value assigned thereto by at least a second predetermined amount and de-energizing each such cell.

8. The method of claim 7 wherein said first and second predetermined amounts are of opposite sign, and wherein said dither matrix $D_n$ comprises the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2", and "3", $U_2$ being a two-by-two matrix each element of which is "1", and $k$ being a predetermined scalar constant.

9. A method for displaying first and second image frames on a display medium which includes a plurality of selectively energizable two-state display cells, said first and second frames respectively comprising first and second pluralities of picture elements each having a predetermined intensity value, and each of said cells having a corresponding picture element in each of said pluralities, said method comprising the steps of, selecting for said first frame one of two predetermined dither threshold values assigned to an individual one of said cells, establishing said individual cell in one or the other of its two states in response to respective predetermined combinations of the value of the selected dither threshold value and the intensity of the first plurality picture element which corresponds to said individual cell, selecting one of said two dither threshold values for said second frame, and changing the state of said individual cell in response to predetermined combinations of the state of said individual cell, the dither threshold value selected for said second frame and the intensity of the second plurality picture element which corresponds to said individual cell.

10. The method of claim 9 wherein in said changing step said individual cell is changed to a de-energized state if said individual cell is energized and said second plurality picture element is less than the dither threshold value selected for said second frame and said individual cell is changed to an energized state if said individual cell is de-energized and said second plurality picture element is greater than the dither threshold value selected for said second frame.

11. The method of claim 9 wherein said two dither threshold values assigned to said individual cell are predeterminately greater than and less than, respectively, a nominal dither threshold value assigned to said individual cell from a predetermined dither matrix $D_n$.

12. The method of claim 11 wherein each said intensity value lies within a range of values, wherein said dither matrix $D_n$ comprises a plurality of nominal dither threshold values distributed within said range, wherein said cells of said display medium are arranged in a plurality of submatrices, and wherein each of said nominal dither threshold values in assigned to a different one of the cells of at least one of said submatrices.

13. The method of claim 12 wherein each of said submatrices comprises $n^2$ cells in $n$ cell-by-$n$ cell arrangement, $n$ being an integer power of 2 and wherein said dither matrix $D_n$ comprises the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ being a two-by-two matrix each element of which is "1" and $k$ being a predetermined scalar constant.

14. A display system comprising, a display panel having a plurality of selectively energizable display cells, means for receiving a time-varying intensity signal representing the intensity of a selected picture element of an animated image, means for providng first and second signals respectively representing first and second thresholds, said first and second thresholds being respectively less than and greater than a predetermined dither threshold value assigned to a selected one of said display cells, and means operative when said intensity signal bears a first predetermined relationship to said first threshold signal for applying a de-energization signal to said selected cell and further operative when said intensity signal bears a second predetermined relationship to said second threshold signal for applying an energization signal to said selected cell.

15. The display system of claim 14 wherein said selected cell comprises one cell of an $n$ cell-by-$n$ cell submatrix of said cells and wherein said dither threshold value is taken from a dither matrix $D_n$ having dither threshold values each assigned to a respective cell of said submatrix.

16. The display system of claim 15 wherein $n$ is an integer power of 2 and wherein said dither matrix $D_n$ comprises the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ being a two-by-two matrix each element of which is "1", and $k$ being a predetermined scalar constant.

17. The display system of claim 15 wherein said providing means includes a memory for storing said dither threshold values of said dither matrix $D_n$ and means responsive to a signal related to the location of said selected cell in said submatrix for extending said first and second signals to said applying means.

18. A display system including a pluraity of selectively energizable and de-energizable bi-level display cells, and circuitry for representing a matrix of picture elements each having a predetermined intensity and each correspondng to a respective one of said display cells, said circuitry comprising
means for energizing a de-energized one of said cells if the intensity of the corresponding picture element bears a first predetermined relationship to a first predetermined dither threshold value assigned to that cell and for de-energizing an energized one of said cells if the intensity of the corresponding picture element bears a second predetermined relationship to a second dither threshold value assigned to that cell.

19. A display system including a matrix of selectively energizable and de-energizable display cells arranged in a plurality of $n$ cell-by-$n$ cell submatrices, $n$ being an integer power of 2, each cell of each submatrix having assigned thereto a different threshold value taken from a predetermined dither matrix $D_n$, said dither matrix comprising the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ being a two-by-two matrix each element of which is "1", and $k$ being a predetermined scalar constant, and circuitry for representing a matrix of picture elements each having a predetermined intensity and each corresponding to a respective one of said display cells, said circuitry comprising
means for identifying each picture element having an intensity exceeding the dither threshold value assigned to its corresponding display cell by at least a predetermined amount and for applying energization signals to each such cell and means includng said identifying and applying means for identifying each picture element having an intensity which is less than the dither threshold value assigned to its corresponding display cell by at least a predetermined amount and for applying de-energization signals to each such cell.

20. A display system comprising,
a display medium having a plurality of selectively energizable two-state display cells,
means for receiving first and second pluralities of picture elements respectively representing first and second image frames to be displayed on said display medium, each of said picture elements having a predetermined intensity value and each of said cells having a corresponding picture element in each of said pluralities,
means for selecting for said first frame one of two predetermined dither threshold values assigned to an individual one of said cells and for selecting for said second frame one of said two dither threshold values,
means for establishing said individual cell in one or the other of its two states in response to respective predetermined combinations of the value of the dither threshold value selected for said first frame and the intensity of the first plurality picture element which corresponds to said individual cell, and
means for thereafter changing the state of said individual cell in response to predetermined combinations of the state of said individual cell, the dither threshold value selected for said second frame and the intensity of the second plurality picture element which corresponds to said individual cell.

21. The display system of claim 20 wherein said changing means comprises means for changing said individual cell to a de-energized state if said individual cell is energized and said second plurality picture element is less than the dither threshold value selected for said second frame and further comprises means for changing said individual cell to an energized state if said individual cell is de-energized and said second plurality picture element is greater than the dither threshold value selected for said second frame.

22. The display system of claim 20 wherein said two predetermined dither threshold values assigned to said individual cell are predeterminately greater than and less than, respectively, a nominal dither threshold value assigned to said individual cell from a predetermined dither matrix $D_n$.

23. The display system of claim 22 wherein each said intensity value lies within a range of values, wherein said dither matrix $D_n$ comprises a plurality of nominal dither threshold values distributed within said range, wherein said cells of said display medium are arranged in a plurality of submatrices, and wherein each of said nominal dither threshold values is assigned to a different one of the cells of at least one of said submatrices.

24. The display system of claim 23 wherein each of said submatrices comprises $n^2$ cells in $n$ cell-by-$n$ cell arrangement, $n$ being an integer power of 2 and wherein said dither matrix $D_n$ comprises the matrices $k(4D_{n/2})$, $k(4D_{n/2} + U_{n/2})$, $k(4D_{n/2} + 2U_{n/2})$ and $k(4D_{n/2} + 3U_{n/2})$ in two-by-two arrangement, $D_2$ being a two-by-two matrix comprising the numbers "0", "1", "2" and "3", $U_2$ being a two-by-two matrix each element of which is "1" and $k$ being a predetermined scalar constant.

* * * * *